Dec. 25, 1934.        O. HERRMANN        1,985,606
GRINDING DEVICE
Filed June 16, 1931
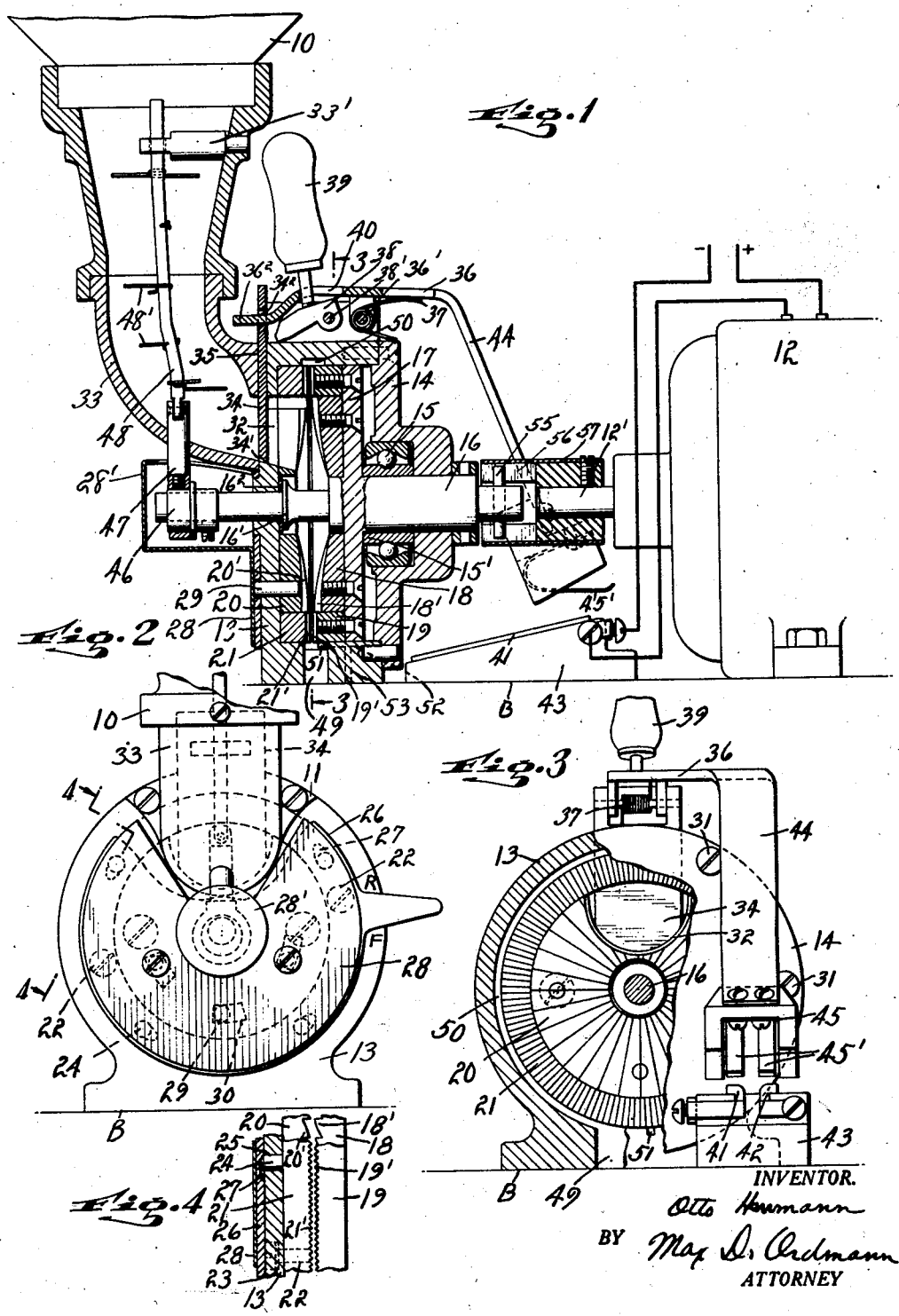
INVENTOR.
Otto Herrmann
BY Max D. Ordmann
ATTORNEY Patented Dec. 25, 1934

1,985,606

UNITED STATES PATENT OFFICE 1,985,606

GRINDING DEVICE

Otto Herrmann, New York, N. Y.

Application June 16, 1931, Serial No. 544,721

1 Claim. (Cl. 83—8)

The present invention relates to a grinder mill for coffee or other material which is adapted to be run by an electric motor.

In existing motor driven grinders it is necessary to employ a comparatively large driving motor in order to avoid the danger of burning out the latter due to jamming of the cutters. This, of course, makes such a device expensive and unadaptable for home use.

One object therefore of the present invention is the provision of a coffee grinder construction which may be effectively operated without danger of jamming by means of a small electric motor having a fractional horsepower rating.

Another object is the provision of a device which is compact and lends itself readily for home use with minimum operational costs.

Still another object is the provision of a grinder construction wherein the cutters are so arranged as to continuously tend to throw the grounds out from the cutters and in which means are provided for bringing said grounds to a suitable outlet.

A further object is the provision of a grinder wherein the raw material is prevented from jamming at the entrance to the cutters and continuously agitated while the cutters are in operation to secure a smooth feeding of said raw material thereto.

And yet another object is the provision of a grinder wherein control of the quantity of material ground is possible.

Still another object is the provision of a grinder wherein the control of the quantity of material ground is commonly actuated with the motor control.

And yet another object is the provision of a grinder which may be manufactured at low cost.

With the above and other objects in view my invention comprises the novel combination, construction, and arrangement of elements to be hereinafter more fully described, shown and defined in the appended claim.

In the accompanying drawing in which similar reference characters denote corresponding parts:—

Fig. 1 is a sectional front elevation of my device;

Fig. 2 is an end elevation of the said device viewed from the left hand side of Fig. 1;

Fig. 3 is a partial section along line 3—3 of Fig. 1 seen in the direction of the arrows; and Fig. 4 is a sectional view along line 4—4 of Fig. 2 of a detail also seen in the direction of the arrows;

Referring to the drawing my device may comprise a feeding hopper 10, a grinder mill 11 and the driving motor 12. The grinder mill 11, is shown in the present instance as made of a hollow casing 13 having a removable face 14.

The removable face 14 is formed centrally with a rearwardly projecting boss 14' which latter has mounted therein a suitable ball bearing 15 which latter serves as a journal for the grinder driving shaft 16.

Suitably attached to or integrally formed with said shaft 16 is a circular base plate 17 which is adapted to rotate with the same. Cutter elements are mounted to said base plate by bolting or other suitable means and may comprise two circular rings 18 and 19 so admeasured in diameter that each succeeding ring snugly fits about the one preceding it and the inner ring 18 snugly fits about the driving shaft 16.

The surface of the inner ring 18 tapers towards the center and is provided with a plurality of radially arranged cutting teeth $18^1$ which may have the ratchet section shown in Fig. 4. The said teeth are so shaped as to become higher and coarser as they progress outwardly toward the outer edge of said ring. In addition the said teeth are curved in reverse direction to the inward taper of the ring so that they have a convex shape. The surface of ring 19 also tapers and is formed with a plurality of radially arranged cutting teeth $19^1$. The said teeth have a substantially regular V-shaped section and are of more uniform height throughout their length. The number of teeth in said ring 19 is greater than those in ring 18 the ratio being between 3 or 4 to 1 and they are not as coarse as teeth $18^1$. The purpose of the above described formation will be presently described. If desired any other number of cutting means or even integral formation of said cutters in one unit may be employed.

It is to be noted that portion $15^1$ of the ball bearing projects on the inner side of member 14 and forms a thrust bearing which prevents frictional engagement between the said inner face of plate 14 and the face of the plate 17.

The casing portion 13 of the housing has mounted therein a stationary cutter which is adapted to cooperate with the rotating one. This cutter is comprised of two circular rings 20 and 21 provided with cutting teeth $20^1$ and $21^1$ arranged identically as the cutting teeth on the corresponding rings on said rotatable plate. Said rings are mounted to said casing 13 by bolting or the like, the inner ring being rigidly fastened and the outer ring being attached by means of bolts 22 whose heads are slidable in countersunk bores 23 in said casing whereby said ring 21 is displaceable longitudinally of said shaft 16 in order that the same may be brought closer to or further away from the corresponding ring 19 on the cutter. In order to effect the said movement of said ring 21, a plurality of cam pins 24 are mounted in openings 25 in said casing 13 and adapted to abut the rear face of said ring 21. They are so admeasured as to project outwardly from the rear face of said casing when the ring 21 is abutting the inner face of the casing. A cam plate 26 having cam notches 27 corresponding in number to said cam pins is rotatably mounted to the rear face of said casing 13 as by being journaled on projecting shoulder 13$^1$ on said casing and is held in place by a cover plate 28 to be presently described. The said notches are of such depth as to permit the projecting ends of said pins 24 to lie therein. However, rotation of said cam ring forces the pins out of said notches and inwardly, causing the ring 21 to be displaced as described. If desired, spring action (not shown) may be employed to return the ring 21 to normal position when the cam plate is returned to its initial position. A suitable stop pin 29 engages in a slot 30 in said given plate 26 to limit the rotation thereof.

The two positions of cam plate are indicated by letters R and F in Fig. 2 of the drawing. R indicates rough cut, e. g. when the ring 21 rests against the casing 13, and F indicates fine cut, e. g. when the ring 21 is pushed towards the rotatable cutter ring 19. Of course, any other means of shifting ring 21 may be employed. The shaft 16 extends towards and projects through and beyond the casing 13. A shoulder 16' is formed on said shaft and abuts the inner face of casing 13 to prevent displacement of shaft 16. A suitable washer 16$^2$ serves to reduce friction at the abutting faces.

The casing 13 and cover 14 are fastened together by bolts 31 or the like.

To feed the coffee beans or other material to be ground in said grinder device, I provide an opening 32 passing through the front face of said casing and cutter 20 so that beans entering the cutter are first engaged by the cutter teeth on the inner rings 18 and 20. Fastened over said opening is a feed tube 33 which is attached to the hopper 10. In said feed tube 33 is a control gate regulating the admission of the material to said grinder device and said gate may comprise a slidable member 34 adapted to enter said tube through a slot 35, in the latter and to close passageway 32. The said slide or gate is provided at its inner end with a bevelled face 34' to facilitate its movement through the coffee beans or other material in the said tube. Adjacent its external end, said gate is provided with a slot 34$^2$.

Pivotally mounted intermediate its ends and to the casing 13 as at 36' is a lever 36 one of whose ends 36$^2$ is adapted to project into and slidably engage slot 34$^2$ of slide 34 so that the latter may be reciprocated vertically by pivotal movement of lever 36. Suitable means such as a spring 37 tends to continuously urge said lever 36 into the position such that member 34 is in its lowermost position to close the opening 32. A suitable cam 38 is also pivotally mounted to said casing 13 at 38' and may be rortated by means of a handle 39 whose stem projects through a slot 40 provided in the lever 36. Rotation of said cam counter to the action of spring 37 serves to correspondingly rotate lever 36 and maintain the latter in said rotated position at which time slide 34 is raised to open the passageway 32. Said cam retains said lever in said rotated position until the handle is rotated in opposite direction to the original position.

Insulatively mounted to a suitable stationary base B to which also the grinder device and the motor 12 are mounted are two parallel electrical contact bars 41 and 42 preferably mounted on an inclined plane on an insulating block 43. The respective contacts are attached to one pole of a power source and one terminal of the motor 12. The other terminal of the motor is attached to the other pole of the power source. Insulatively mounted on an extension 44 of said lever 36 is a bridging member 45, which has spring contacts 45' which may engage both said contact bars 41 and 42. In normal position of lever 36, when the gate is closed, contact 45 is clear of the contacts 42 and 43. As soon as the gate starts to open and before any coffee beans are permitted to enter the grinder mill, the motor circuit is closed by the engagement of the contact member 45$^1$ with contact bars 41 and 42 and remain in such engagement as long as the gate remains open. The closing of the motor circuit before any coffee bean enters the cutter is advantageous in that it permits the motor to start before any beans reach the cutter and thereby prevents jamming. Any other suitable switching arrangement may be employed.

It has been found that unless some means continuously agitating the coffee bean or other material in the tube 33 is provided, improper feed of the raw material to the cutter results. To eliminate this draw-back I provide an eccentric 46 on a projecting end of shaft 16. Rotatably mounted on the eccentric is a connecting arm 47 to which is pivotally attached a stem 48 which projects into the tube 33. Projecting laterally at suitable intervals on said stem are a plurality of members 48$^1$. When the shaft rotates, stem 48 is given vibratory motion by means of an eccentric 46 whereby the coffee beans in tube 33 are agitated by members 48$^1$ and consequently are moved down regularly and uniformly into opening 32 and to the cutters. The upper end of stem 48 is slidably guided in a member 33$^1$ in tube 33. It has been found that by use of this agitating means coffee may be rapidly ground in smooth and efficient manner.

As has been previously mentioned the coffee which is to be ground enters the coarse portion of the cutters near the shaft 16 and gradually moves outwardly towards the circumference of the outside cutter. A suitable outlet 49 is provided in said casing through which the ground coffee drops to a suitable receptacle not shown. To prevent sticking a circumferential annular groove 50 is provided interiorly of the casing adjacent the space between the stationary and rotary cutters. The ground coffee is thrown into said annular groove. To prevent its sticking in the walls of the groove, I provide a radial projection or projections 51 on the external rotary cutter ring 21 which moves about through said annular groove and sweeeps before it all the ground coffee to the outlet 49.

By reason of the provision of member 51 it is necessary to provide a slot 52 in the circumferential wall of the casing 13 in order to assemble the device. After assembly however, unless this slot is stopped up, coffee grounds will get behind the rotary cutter and into the bearing 15. To prevent this the slot may be stopped by means of packing inserted through a suitable opening 53 of said casing.

The cover plate 28 at its central portion has an enlarged chamber portion $28^1$ which serves as a protective housing for the eccentric 46 and connecting arm 47.

Shaft 16 is coupled to the motor shaft $12^1$ by any suitable coupler means. For instance, shaft 16 may have a coupling pin 55 thereon which engages in a slot 56 in a coupling sleeve 57 which latter is keyed or bolted to said shaft $12^1$. For silent operation, the portion of the coupling sleeve which has the slot 56 may be made of non-metallic material such as wood, hard rubber or the like.

My device operates as follows:—

The coffee beans or other material to be ground is poured into the hopper 10. Then the gate 34 is opened and the motor 12, as previously described, because of the switch arrangement is already well under way when the beans begin to enter the cutters. In said cutters said beans are first seized by the teeth of the rings 18 and 20 and cut quite coarsely. The coarsely cut grounds are thrown towards the second rings 19 and 21 by centrifugal force and given their final cut between the teeth of the latter cutters. The comparative fineness of said teeth and their regular V-shaped section serves to give uniformity to the coffee grounds. Examination of said grounds will show that they are very regular. Then the grounds are further flung by centrifugal force to the annular groove 50 from whence they are swept to the outlet 49 by means of member 51. The grounds fall out through said outlet and may be collected in a suitable receptacle (not shown) ready for use.

It is obvious that my device may be modified in many ways without departing from the spirit of my invention and I do not wish to be limited to the details shown and described.

What I claim is:—

In a mill having grinding means and means for driving the latter, conduit means for directing the material to be ground to said grinding means, an eccentric driven by said driving means, a connecting arm mounted on said eccentric, a stem pivotally connected to said connecting arm and extending through said conduit means and agitating means in said conduit means for smoothly feeding the material to be ground, said agitating means comprising laterally projecting members mounted at intervals along said stem, and a member in said conduit means in which the upper end of said stem is slidably guided.

OTTO HERRMANN.